United States Patent
Uematsu et al.

(10) Patent No.: US 9,948,167 B2
(45) Date of Patent: Apr. 17, 2018

(54) ROTOR OF MOTOR WHICH USES MAGNETS TO ACHIEVE VARIATION-FREE TORQUE

(71) Applicant: FANUC CORPORATION, Yamanashi (JP)

(72) Inventors: Hidetoshi Uematsu, Yamanashi (JP); Takeshi Tamaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 319 days.

(21) Appl. No.: 14/853,546

(22) Filed: Sep. 14, 2015

(65) Prior Publication Data
US 2016/0006327 A1 Jan. 7, 2016

Related U.S. Application Data

(63) Continuation of application No. 14/068,024, filed on Oct. 31, 2013, now abandoned.

(30) Foreign Application Priority Data

Oct. 31, 2012 (JP) .................................. 2012-240767

(51) Int. Cl.
*H02K 15/03* (2006.01)
*H02K 1/02* (2006.01)
*H02K 1/27* (2006.01)

(52) U.S. Cl.
CPC .............. *H02K 15/03* (2013.01); *H02K 1/02* (2013.01); *H02K 1/276* (2013.01); *H02K 1/278* (2013.01);

(Continued)

(58) Field of Classification Search
CPC .......... H02K 15/03; H02K 1/02; H02K 1/276; H02K 1/278; H02K 1/27; H02K 2213/03; Y10T 29/49012

(Continued)

(56) References Cited

U.S. PATENT DOCUMENTS

2002/0167240 A1* 11/2002 Uchida .................... H02K 7/06
310/152
2003/0102755 A1* 6/2003 Naito ................... H02K 1/2766
310/156.39

(Continued)

FOREIGN PATENT DOCUMENTS

CN         1336711 A       2/2002
JP        S64047248 A      2/1989

(Continued)

OTHER PUBLICATIONS

Machine translation of JP 2008054376 A (Mar. 2008).*

(Continued)

*Primary Examiner* — Michael Andrews
(74) *Attorney, Agent, or Firm* — Fredrikson & Byron, P.A.

(57) ABSTRACT

A rotor (10) of a motor includes a rotor core (11) and a plurality of magnets (14a, 14b) which are arranged at a circumferential surface of the rotor core or at the inside of the rotor core, the length of a magnet of the plurality of magnets in the axial direction of the rotor core determined in accordance with the residual magnetic flux density of the magnet. The axial direction length of the magnet is preferably determined by multiplying a reference axial direction length of the magnet with the residual magnetic flux density of the magnet and dividing this by a reference residual magnetic flux density of the magnet.

4 Claims, 3 Drawing Sheets

(52) U.S. Cl.
CPC ..... *H02K 2213/03* (2013.01); *Y10T 29/49012* (2015.01)

(58) Field of Classification Search
USPC .......................................................... 310/43
See application file for complete search history.

(56) References Cited

U.S. PATENT DOCUMENTS

| | | | | |
|---|---|---|---|---|
| 2009/0115279 | A1* | 5/2009 | Spaggiari | ............... H02K 1/276 310/156.53 |
| 2012/0091846 | A1* | 4/2012 | Nagai | .................. H02K 1/2766 310/156.01 |

FOREIGN PATENT DOCUMENTS

| | | | | |
|---|---|---|---|---|
| JP | H05252676 | A | | 9/1993 |
| JP | 11234931 | A | | 8/1999 |
| JP | 2000324736 | A | | 11/2000 |
| JP | 2005204499 | A | | 7/2004 |
| JP | 2007282392 | A | | 10/2007 |
| JP | 2008054376 | A | * | 3/2008 ............. H02K 15/03 |
| JP | 4708445 | B2 | | 5/2008 |
| JP | 2010068600 | A | | 3/2010 |

OTHER PUBLICATIONS

English Translation of Chinese Publication No. CN1336711, published Feb. 20, 2002, 13 pages.
English Machine Translation for Japanese Publication No. H11234931, published Aug. 27, 1999, 20 pages.
English Machine Translation for Japanese Publication No. 2000324736, published Nov. 24, 2000, 13 pages.
English Machine Translation for Japanese Publication No. 2005204499, published Jul. 28, 2005, 63 pages.
English Machine Translation for Japanese Publication No. 2007282392A, published Oct. 25, 2007, 19 pages.
English Machine Translation for Japanese Publication No. 2008054376, published Mar. 6, 2008, 21 pages.
English Machine Translation for Japanese Publication No. 2010068600, published Mar. 25, 2010, 30 pages.
English Machine Translation for Japanese Publication No. H05252676, published Sep. 28, 1993, 9 pages.
English Machine Translation of Abstract for Japanese Publication No. S64047248, published Feb. 21, 1989, 1 page.

* cited by examiner

ROTOR OF MOTOR WHICH USES MAGNETS TO ACHIEVE VARIATION-FREE TORQUE

RELATED APPLICATIONS

This application is a continuation of U.S. patent application Ser. No 14/068,024, filed Oct. 31, 2013, which claims priority to Japanese Pat. App. No. 2012-240767, filed Oct. 31, 2012, the teachings of which are incorporated herein by reference.

BACKGROUND OF THE INVENTION

1. Technical Field

The present invention relates to a rotor of a motor which uses magnets and a method of production of such a rotor.

2. Description of the Related Art

As described in Japanese Patent No. 4708445 etc., the rotor of a motor includes a plurality of magnets in the circumferential direction and axial direction. When using magnets as parts of a motor, the higher the magnetic flux densities of the magnets, the greater the gap magnetic flux of the motor and the greater the torque which the motor generates. In this regard, the higher the magnetic flux densities of the magnets, the higher the back electromotive force becomes. For this reason, normally a d-axis current is run in the magnetic flux direction in accordance with the back electromotive force. Due to this, it is necessary to lower the voltage applied to the motor to the input voltage or less. Such a d-axis current is generally controlled by an open loop. When the back electromotive force fluctuates, it is necessary to run extra d-axis current as reactive current, so the motor efficiency falls.

In this regard, magnets are produced by a plurality of manufacturers. Therefore, the magnetic flux densities of magnets differ slightly depending on the manufacturer. For example, the magnetic flux density of a magnet which is produced by a Company A will be 1.27 to 1.33 T, the magnetic flux density of a magnet which is produced by a Company B will be 1.30 to 1.36 T, and the magnetic flux density of a magnet which is produced by a Company C will be 1.33 to 1.39 T.

When using magnets with different magnetic flux densities at the same motor, there is the problem of a variation in torque of the motor depending on the type of magnets which are used. Furthermore, it is necessary to run a reactive current, so there is also the problem that the motor efficiency falls.

The present invention was made in consideration of this situation and has as its object the provision of a rotor of a motor which is free of variation in torque even if using magnets of different magnetic flux densities at the same motor and a method of production of such a rotor.

SUMMARY OF THE INVENTION

To achieve the above-mentioned object, according to a first aspect, there is provided a rotor of a motor comprising a rotor core and a plurality of magnets which are arranged at the circumferential surface of the rotor core or at the inside of the rotor core, wherein the length of a magnet of the plurality of magnets in the axial direction of the rotor core is determined in accordance with the residual magnetic flux density of the magnet.

According to a second aspect, there is provided the first aspect wherein the axial direction length of the magnet is determined by multiplying a reference axial direction length of the magnet with the residual magnetic flux density of the magnet and dividing this by a reference residual magnetic flux density of the magnet.

According to a third aspect, there is provided the first or second aspect wherein the axial direction length of the magnet is made shorter than the axial direction length of the rotor core.

According to a fourth aspect, there is provided any one of the first to third aspects wherein the inside of the rotor core is formed with a plurality of magnet holding holes which hold the plurality of magnets in the axial direction, the plurality of magnets are held in the plurality of magnet holding holes, the resin which is filled in the gaps between the plurality of magnets and the magnet holding holes is used to fix the magnets in place, and the amounts filled of the resin differ according to the axial direction lengths of the plurality of magnets.

According to a fifth aspect, there is provided the fourth aspect wherein one ends of the plurality of magnets are positioned at one ends of the magnet holding holes in the axial direction of the rotor core, and the resin is filled between the other ends of the plurality of magnets and the other ends of the magnet holding holes.

According to a sixth aspect, there is provided a method of production of a rotor of the first aspect comprising steps of arranging the plurality of magnets in a plurality of magnet holding holes which are formed in the axial direction inside the rotor core, filling a resin in the gaps between the magnet holding holes and the magnets to fix the magnets in place, and making the amounts of the resin filled different in accordance with the axial direction lengths of the magnets.

According to a seventh aspect, there is provided the sixth aspect further comprising steps of positioning one ends of the plurality of magnets at one ends of the magnet holding holes in the axial direction of the rotor core and making the resin be filled between the other ends of the plurality of magnets and the other ends of the magnet holding holes.

These and other objects, features, and advantages of the present invention will become clearer from the detailed description of typical embodiments of the present invention which are shown in the attached drawings.

DETAILED DESCRIPTION

Below, embodiments of the present invention will be explained with reference to the attached drawings. In the following figures, similar members are assigned similar reference notations. To facilitate understanding, these figures are suitably changed in scale.

Figure 1A:
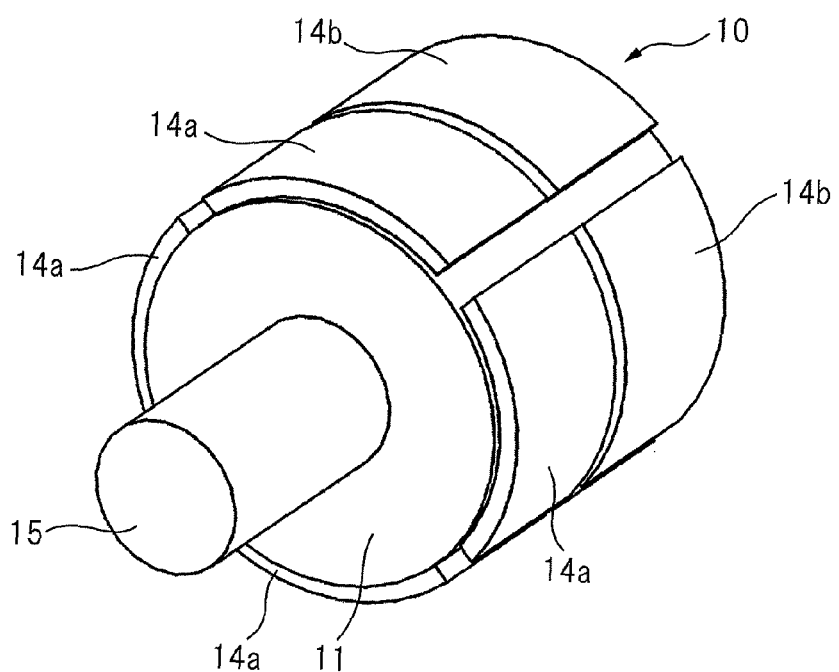
FIG. 1A is a perspective view of a rotor according to a first embodiment of the present invention.
Figure 1B:
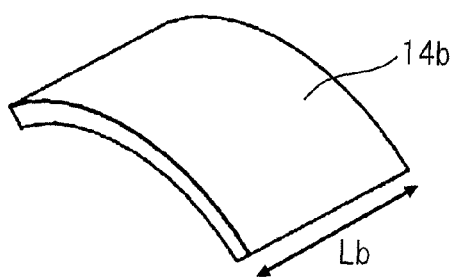
FIG. 1B is a view which shows one magnet of the rotor which is shown in FIG. 1A.

FIG. 1A is a perspective view of a rotor according to a first embodiment of the present invention, while FIG. 1B is a view which shows one magnet of the rotor which is shown in FIG. 1A. A rotor 10 of an electric motor which is shown in FIG. 1A includes a rotor core 11 which is formed from a conductive electrical steel sheet, iron, aluminum, a pressed powder core, or other material. The rotor core 11 is engaged with the outer circumferential surface of a shaft 15 by press-fitting, shrink-fitting, etc. and rotates together with the shaft 15.

As shown in FIG. 1A, the outer circumferential surface of the rotor core 11 has a plurality of, in FIG. 1A, four, magnets 14a attached to it in the circumferential direction. Further, in the axial direction, it has a further four magnets 14b similarly attached to the outer circumferential surface of the rotor core 11 separated from the fourth magnets 14a in the axial direction of the rotor core 11.

As shown in FIG. 1A, pairs of magnets 14a and magnets 14b are arranged separated in the axial direction of the rotor core 11. In this connection, assume that the magnets 14a and magnets 14b differ from each other in manufacturer. For example, assume the magnets 14a are prepared by the Company A, while the magnets 14b are prepared by the Company B. For this reason, the magnets 14a and 14b differ from each other in magnetic flux densities. Assume that the magnets 14a have magnetic flux densities of 1.2 T, while the magnets 14b have magnetic flux densities of 1.3 T. Note that, three or more magnets may also be arranged in the axial direction of the rotor core 11 in another configuration.

The cross-sectional shapes of the magnets 14a and 14b have an effect on the flow or magnetism, so it is not practical to change the cross-sectional shapes of the magnets 14a and 14b. Therefore, these magnets 14a and 14b are preferably equal in cross-sectional shapes and circumferential direction lengths. As opposed to this, when changing the axial direction lengths of the magnets 14a and 14b, only the total amount of magnetic flux changes. The effect on the direction of flow of magnetism is small.

Therefore, it is preferable to set the axial direction lengths of the magnets in accordance with the magnetic flux densities. Specifically, the axial direction length Lb of a magnet 14b (see FIG. 1B) is expressed by the following equation (1) using the axial direction length La of the corresponding magnet 14a and the magnetic flux densities Ba and Bb of the magnet 14a and magnet 14b:

$$Lb = La \times (Ba/Bb) \quad (1)$$

Specifically, $Lb = La \times (1.2/1.3) \approx 0.92\ La$. Note that the magnetic flux densities of the magnets 14a and 14b can be easily grasped from the catalogs or specifications etc. of the Company A and Company B.

Further, to prevent magnetic flux leakage, Lb has to be no more than the axial direction length of the rotor core 11. In other words, the axial direction length of the rotor core 11 is the upper limit value of Lb.

When setting the axial direction length Lb of a magnet 14b in this way, it is possible to easily standardize the total amounts of magnetic flux for the different electric motors which are produced. In general, the torque generated by an electric motor is proportional to the total amount of magnetic flux. Therefore, in the present invention, it is possible to keep the torque generated by electric motors from varying depending on the electric motors. Furthermore, in the present invention, it is also possible to adjust the value of the required back electromotive force.

In this regard, assume that all of the magnets 14a and 14b in FIG. 1A are, for example, manufactured by the Company A and have a common magnetic flux density Ba. Further, consider the case of replacing the four magnets 14b with equal axial direction positions in these magnets with other magnets with different magnetic flux densities, for example, with magnets of the Company B. As explained above, the magnetic flux densities of the magnets of the Company B are Bb. Further, assume that the magnets of the Company A have mutually equal axial direction lengths.

In such a case, the axial direction length Lb of a magnet 14b after replacement is expressed by the following equation (2):

$$Lb = Lb0 \times (Bb/Ba) \quad (2)$$

where: Lb0 is the axial direction length of the magnet of the Company A which is arranged at the location of the magnet 14b before replacement. In other words, equation (2) can be said to be like the following equation (2)'.

$$Lb = \text{Reference axial direction length} \times (\text{magnetic flux density of magnet after replacement/magnetic flux density of magnet before replacement}) \quad (2)'$$

In such a case as well, similar effects as those explained above are obtained as will be clear to a person skilled in the art. Note that, the reference axial direction length is a value which is freely determined for design purposes.

Figure 2A:
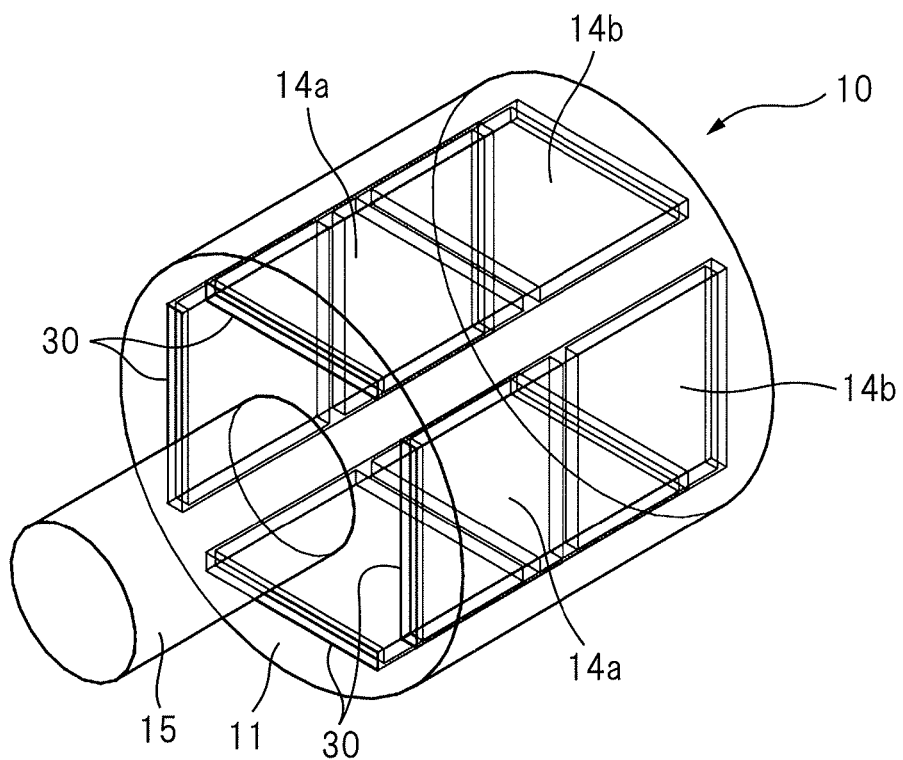
FIG. 2A is a perspective view of a rotor according to a second embodiment of the present invention.
Figure 2B:
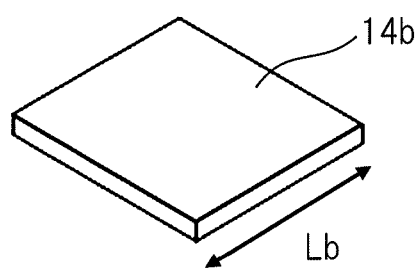
FIG. 2B is a view which shows one magnet of the rotor which is shown in FIG. 2A.

FIG. 2A is a perspective view of a rotor according to a second embodiment of the present invention, while FIG. 2B is a view which shows one magnet of the rotor which is shown in FIG. 2A. The rotor 10 which is shown in FIG. 2A is a rotor which is used for a so-called interior permanent magnet (IPM) type of electric motor.

As shown in FIG. 2A, the rotor core 11 is formed with a plurality of, in the figure, four, slots 30 which extend in the axial direction. These slots 30 are formed at equal intervals in the circumferential direction and are mutually vertical. Further, as can be seen from FIG. 2A, at the slots 30, pairs of magnets 14a and magnets 14b are arranged separated in the axial direction.

The magnets 14a and magnets 14b are arranged in the slots 30, then resin is filled in the slots 30. The resin performs the role of fixing the magnets in place, so the magnets 14a and 14b are held inside the slots 30. The fact that even with the rotor 10 of the interior permanent magnet type of electric motor which is shown in FIG. 2A, as explained above, the length of a magnet 14b (see FIG. 2B) can be determined will be easily understood by a person skilled in the art.

In this regard, in the rotor 10 which is shown in FIG. 2A, the amounts of resin which are filled in the slots 30 differ in accordance with the axial direction lengths of the magnets 14a and 14b which are arranged in the slots 30. Assume that, in FIG. 1A, all of the magnets 14a and 14b are produced by the same manufacturer, for example, are produced by the Company A, and have axial direction lengths which are equal to each other. Further, consider the case where among the four magnets 14b where the axial direction positions are equal to each other, only one is replaced with another magnet which differs in magnetic flux density, for example, a magnet of the Company B.

In such a case as well, as explained above, the length of a magnet 14b (see FIG. 2B) is set. Therefore, the amount of resin which is filled in the slot 20 in which the replaced magnet 14b is arranged differs from the amounts of resin which are filled in the other slots 30. In other words, in the present invention, the amounts of resin which are filled are changed in accordance with the lengths of the magnets 14a and 14b which are arranged in the slots 30. Amounts of resin which are suitable for the different slots 30 are filled.

Figure 3:
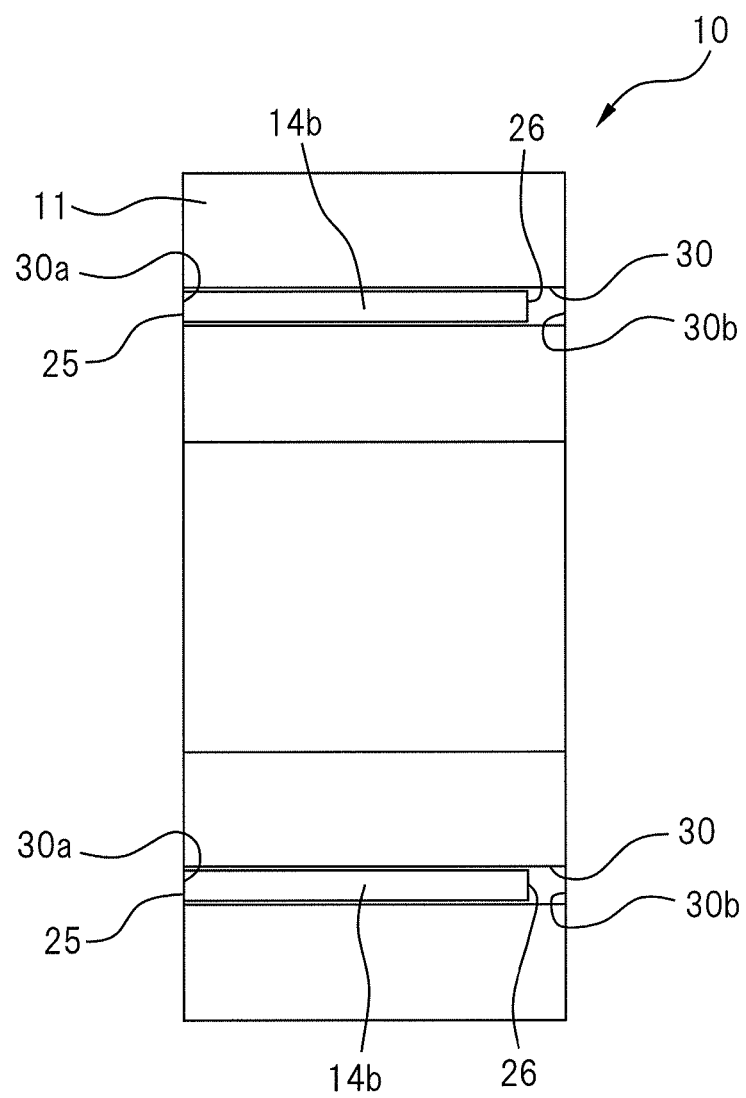
FIG. 3 is a partial cross-sectional view of the rotor in the axial direction.

FIG. 3 is a partial cross-sectional view along the axial direction of the rotor. In FIG. 3, to facilitate understanding, the magnets 14a are omitted and a rotor core 11 of a shape corresponding to only the magnets 14b is shown. In FIG. 3, one ends 25 of the magnets 14b are aligned with one ends 30a of the slots 30. For this purpose, it is preferable to use an abutting fixture (not shown) which at last partially closes the one ends 30a of the slots 30.

Then, the gaps between the other ends 26 of the magnets 14b and the other ends 30b of the slots 30 are filled with a resin. For this reason, the amounts of the resin which are filled differ in accordance with the slots 30. Therefore, if the axial direction lengths of the magnets 14b which are arranged at the slots 30 can be grasped, the amounts of resin which are filled are automatically determined. Due to this, it becomes possible to suitably manage the amounts of resin which should be filled. Note that even when providing predetermined gaps between the one ends 30a of the slots 30 and the one ends 25 of the magnets 14b, it will be clear that similar advantageous effects will be obtained.

Advantageous Effects of Invention

In the present invention, the axial direction lengths of the magnets are determined in accordance with the magnetic flux densities of the magnets. Specifically, the axial direction length of a magnet is determined by multiplying a reference axial direction length of the magnet with the residual magnetic flux density of the magnet (magnetic flux density of magnet after replacement) and dividing this by a reference residual magnetic flux density of the magnet (magnetic flux density of magnet before replacement). Therefore, it is possible to suitably determine the axial direction lengths of the magnets and keep the torque from varying in accordance with the motor.

Typical embodiments were used to explain the present invention, but a person skilled in the art would understand that the above-mentioned changes and various other changes, deletions, and additions may be made without departing from the scope of the present invention.

The invention claimed is:

1. A method of production of a rotor comprising steps of:
providing a rotor core having a plurality of first magnets which are arranged either at a circumferential surface of said rotor core or at an inside surface of said rotor core, wherein each of the plurality of first magnets has a reference magnetic flux density;

selecting at least one second magnet to replace at least one of the first magnets, the second magnet having a residual magnetic flux density; and adjusting the axial direction length of the at least one second magnet so that it has the same residual magnetic flux density as the first magnet it is replacing;

wherein the step of adjusting the axial direction length of the at least one second magnet comprises multiplying the axial direction length of said first magnet it is replacing with the residual magnetic flux density of said second magnet and dividing this by the reference residual magnetic flux density of said first magnet rotor it is replacing.

2. The method of claim 1, wherein the axial direction length of said first and second magnets are made shorter than the axial direction length of said rotor core.

3. The method of claim 1, wherein said plurality of first and second magnets are held in a plurality of magnet holding holes formed in the inside of said rotor core extending in the axial direction, in the case where said plurality of magnets are arranged inside the rotor core, filling gaps between said plurality of magnets and said magnet holding holes with resin which is used to fix said magnets in place, and varying the amounts of resin used to fill the gaps dependent upon the axial direction lengths of said plurality of magnets.

4. The method of claim 3 further comprising positioning an end of each said plurality of magnets at one end of said magnet holding holes in the axial direction of said rotor core; and filling the resin between an opposite end of said plurality of magnets and an opposite end of said magnet holding holes.

* * * * *